(12) United States Patent
Prakash et al.

(10) Patent No.: US 8,418,122 B2
(45) Date of Patent: Apr. 9, 2013

(54) INCORPORATING FUNCTIONALITY FROM AN OBJECT FILE INTO AN EXISTING BINARY FILE

(75) Inventors: Raj Prakash, Saratoga, CA (US); Chandrashekhar R. Garud, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1676 days.

(21) Appl. No.: 11/549,219

(22) Filed: Oct. 13, 2006

(65) Prior Publication Data

US 2008/0092129 A1    Apr. 17, 2008

(51) Int. Cl.
*G06F 9/44* (2006.01)

(52) U.S. Cl.
USPC ............ 717/100; 717/110; 717/153; 717/158

(58) Field of Classification Search .......... 717/106–111, 717/124–133, 155–166, 153
See application file for complete search history.

(56) References Cited

U.S. PATENT DOCUMENTS

| | | | | |
|---|---|---|---|---|
| 5,822,787 A * | 10/1998 | Zucker | | 711/213 |
| 5,966,541 A * | 10/1999 | Agarwal | | 717/132 |
| 6,292,934 B1 * | 9/2001 | Davidson et al. | | 717/158 |
| 6,802,060 B1 * | 10/2004 | Shann | | 717/162 |
| 6,859,932 B1 * | 2/2005 | Shann | | 719/331 |
| 6,898,788 B2 * | 5/2005 | Kosaka et al. | | 717/162 |
| 6,948,164 B2 * | 9/2005 | Tinker | | 717/168 |
| 7,127,711 B2 * | 10/2006 | Shann et al. | | 717/162 |
| 7,200,843 B2 * | 4/2007 | Shann | | 717/162 |
| 7,299,462 B2 * | 11/2007 | Shann et al. | | 717/162 |
| 7,376,941 B2 * | 5/2008 | Allen | | 717/157 |
| 7,634,762 B1 * | 12/2009 | Wheeler et al. | | 717/136 |
| 7,784,042 B1 * | 8/2010 | Lobo et al. | | 717/159 |
| 8,261,247 B2 * | 9/2012 | Arnold | | 717/153 |
| 2004/0015927 A1 * | 1/2004 | Haber et al. | | 717/155 |
| 2004/0088691 A1 * | 5/2004 | Hammes et al. | | 717/158 |
| 2006/0190930 A1 * | 8/2006 | Hecht et al. | | 717/128 |

OTHER PUBLICATIONS

Tanenbaum, "Structured Computer Organization", 1999, Prentice Hall, Inc. 4th Edition, Section 7.4.3, p. 512-515.*

* cited by examiner

*Primary Examiner* — Phillip H Nguyen
(74) *Attorney, Agent, or Firm* — Polsinelli Shughart PC

(57) ABSTRACT

Functionality from an object file can be incorporated into an already existing binary file. Functions from the object file can be intelligently inserted into the binary file with the guidance of control flow analysis of both the binary file and the object file. Symbols not defined in the symbol table of the binary file are added to the symbol table of the binary file. When symbols of the object file and the binary file overlap, then priority is given to the object file symbol definitions. The ability to incorporate functionality from an object file into an existing binary file reduces logistical overhead and provides flexibility in code development and maintenance.

19 Claims, 4 Drawing Sheets

INCORPORATING FUNCTIONALITY FROM AN OBJECT FILE INTO AN EXISTING BINARY FILE

BACKGROUND

1. Field of the Invention

The invention generally relates to the field of computers, and, more particularly, to code development tools.

2. Description of the Related Art

When compiling code, an executable binary file is generated by linking a set of object files. To add or modify functionality of the binary file with functionality from an additional object file, the set of object files can be re-compiled with the additional object file. Another technique for modifying functionality with functionality of an object file is interposition. For example, a binary file dynamically links with an object file in a predefined path that is indicated in an interposition file. If no such file is found in the pre-defined path, then a default path will be searched. To modify either of the paths, the interposition file can be modified. Thus, the binary file will dynamically link the new object file. However, this technique relies on the forethought during development to define the paths in the interposition file. Furthermore, the new object file must accompany the binary file.

Once an executable or a shared library, henceforth called a binary, is created it cannot be modified extensively by conventional means. A binary can be modified in simple ways, usually called instrumentation, in order to collect profile information. However, there is no easy method available if one wants to add new capabilities, such as adding new functions and overriding existing functions with new or different ones.

SUMMARY

It has been discovered that one or more object files can be merged into a binary file, thus extending or modifying the functionality of the binary file. A tool can insert or append a function into a binary from an object file. The tool updates the symbol table of the binary file to add symbols or redefine symbols corresponding to the function from the object file. For insertion of one or more functions, the tool can be intelligently guided with control flow analysis of the binary file.

BRIEF DESCRIPTION OF THE DRAWINGS

The present invention may be better understood, and its numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. In other instances, well-known instruction instances, protocols, structures and techniques have not been shown in detail in order not to obfuscate the description.

Figure 1:
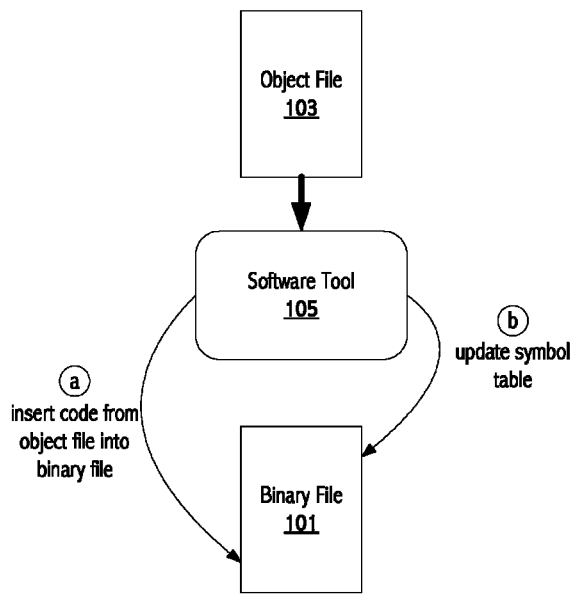
FIG. 1 depicts an example tool merging an object file into a binary file.

FIG. 1 depicts an example tool merging an object file into a binary file. A software tool 105 receives an indication of an object file 103. For example, a file is clicked on, a path name and file name are entered, etc. The software tool also receives indication of a binary file 101. The software tool 105 inserts code from the object file 103 into the binary file 101. The software tool 105 then updates a symbol table of the binary file 101 to reflect symbols for the inserted code. In addition to a functional code unit (e.g., a function, method, procedure, etc.), symbols may be added or redefined for variables, data structures, etc. Adding the code unit extends and/or modifies functionality of the already existing binary file 101 with functionality of the code unit from a new relocatable object file without using a link editor and without using the sources or relocatable objects that were used to build the original binary file 101. The code unit may be appended to the end of the binary file 101 or may be intelligently inserted into the binary file 101.

For intelligent insertion, the software tool 105 utilizes information from control flow analysis of the binary file 101. The software tool (or another tool) first reads the binary file and creates a control flow graph. The object file is also read and to generate a control flow graph. Text and data in the object file are added to newly created text and data segments in the binary. Global symbols defined in the object file are compared against symbols in the binary file. If they match, the reference to these symbols in the binary are changed to symbols that came from the object file.

The code unit being added to the binary file 101 may be for all functional code units in the object file 103 or less than all of the functional code units. For example, after indicating the object file 103, the user may be prompted to select or input a function name to be incorporated into the binary file 101. If the entire object file is to be merged, of course some information is not carried along, such as header information.

The incorporated code may make calls to functions defined external to the binary, for example to a function that is in another shared library, such as malloc( ) in libc. Modification may be performed to address such calls. For example, data structures, such as the procedure linkage table (PLT) may be modified to make such a call.

Figure 2:
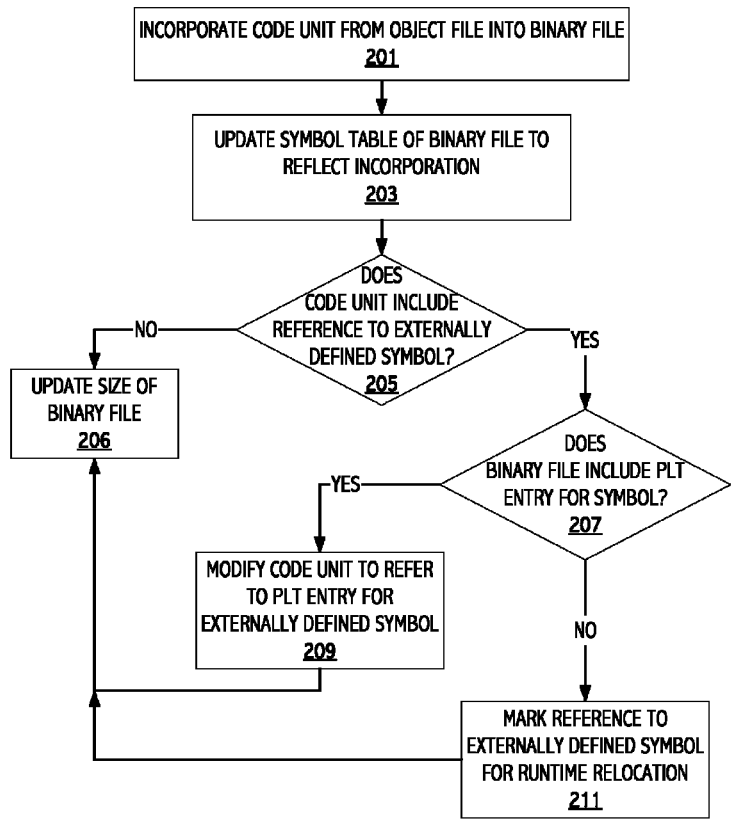
FIG. 2 depicts an example flowchart for updating code that references an externally defined symbol.

FIG. 2 depicts an example flowchart for updating code that references an externally defined symbol. At block 201, a code unit from an object file is incorporated into a binary file. At block 203, the symbol table of the binary file is updated to reflect the incorporation. At block 205, it is determined if the code unit includes a reference to an externally defined symbol. If so, then control flows to block 207. If not, then control flows to block 206.

At block 206, the size of the binary file is updated to account for the code unit.

At block 207, it is determined if the binary file includes an entry in a procedure linkage table (PLT) for the externally defined symbol. Although this example refers to a PLT, those of ordinary skill in the art will appreciate that link tables for dynamic linking have various monikers, but essentially fulfill the same role. If the binary file PLT does not include a corresponding entry, then control flows to block 211. If the binary file does include a corresponding entry, then control flows to block 209.

At block 209, the reference in the code unit to the externally defined symbol is modified to reference the corresponding entry in the binary file PLT. Control flows from block 209 to block 206.

At block 211, the code unit marked for runtime relocation. Other techniques can be employed to reconcile the externally defined symbol. For example, instead of marking for runtime relocation, the code unit can be modified to utilize an available function that opens a particular path. The opened path is then searched for the object file that defines the externally defined symbol. For example, a call to an externally defined function is converted into a dynamic lookup, dlsym( ). The call to the externally defined function is then made using the function pointer returned by dlsym( ). If the symbol is not readily available, a dlopen( ) may be required first. The dlopen( ) may also be done as part of the initialization process in order to reduce the overhead of dlopen( ) when the original function is called. Control flows from block 211 to block 206.

Figure 4:
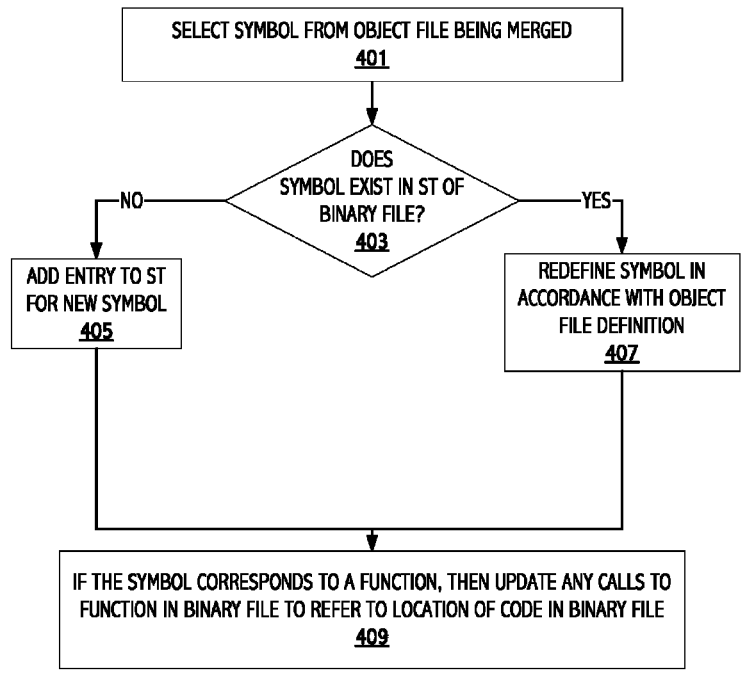
FIG. 4 depicts an example flowchart for updating a symbol table for merging an object file and a binary file.

FIG. 4 depicts an example flowchart for updating a symbol table for merging an object file and a binary file. At block 401, a symbol from the object file is selected. At block 403, it is determined if the selected symbol already exists in a symbol table of the binary file. If the symbol exists in the binary file symbol table, then control flows to block 407. IF the symbol does not exist in the binary file symbol table, then control flows to block 405.

At block 405, a new entry is added to the binary file symbol table for the symbol. Control flows to block 409 from block 405.

At block 407, the symbol in the binary file symbol table is redefined in accordance with the corresponding symbol definition in the object file symbol table. However, the old definition for the symbol may not be overwritten. Preserving the old symbol definition allow redo. For example, a user may wish to do tests of functions without recompiling. If the test fails or produces undesirable results, then the old definition can be restored.

At block 409, if the symbol corresponds to a function (method, procedure, etc.), then any calls to the function in the binary file are modified to reference the location of the function within the binary file.

Incorporating functionality from an object file into an already existing binary file provides flexibility in code development. After shipping, a binary file can be modified with functionality written by a third party. Incorporating also reduces logistical overhead since fewer files need to be tracked. The single binary file includes any added object files. Moreover, modifications to the binary file can be performed without the source files.

The described embodiments may be provided as a computer program product, or software, that may include a machine-readable medium having stored thereon instructions, which may be used to program a computer system (or other electronic device(s)) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 3:
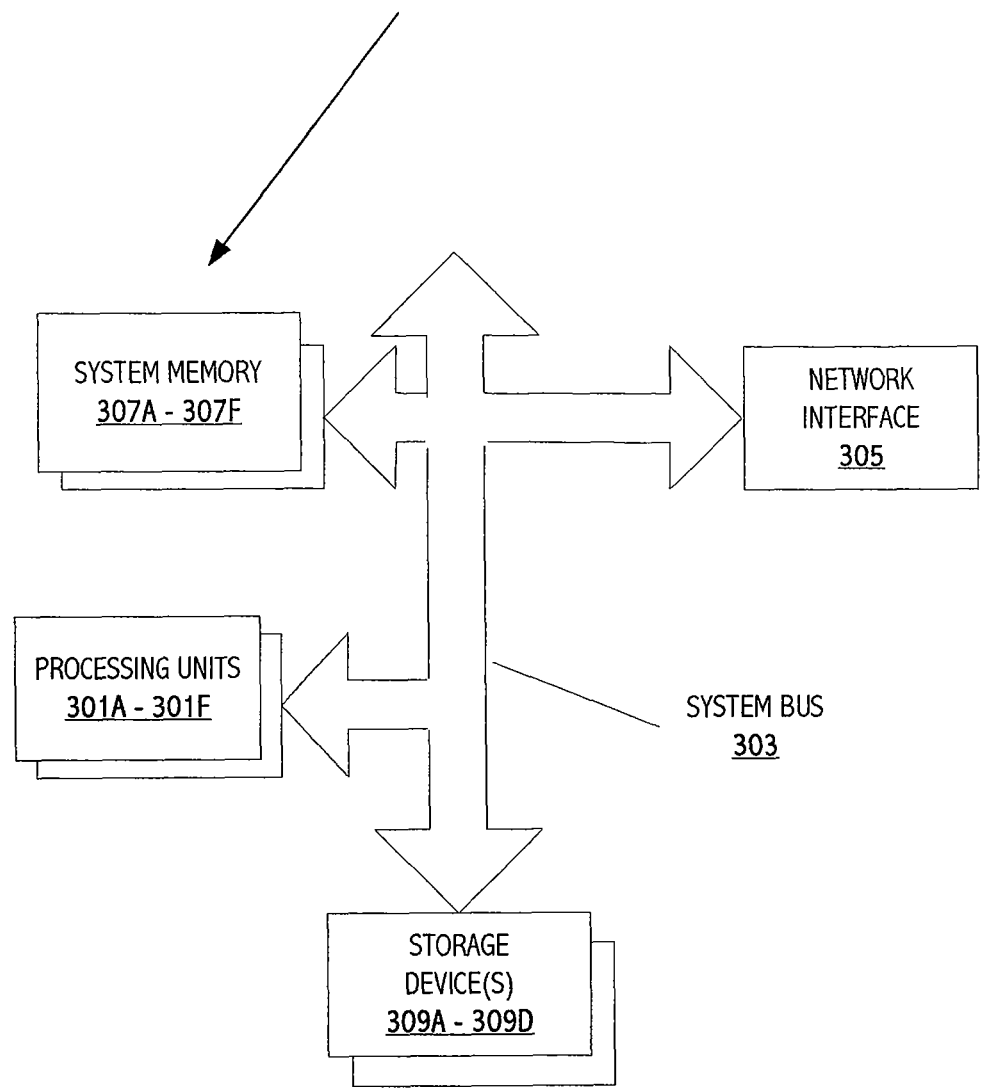
FIG. 3 depicts an example computer system.

FIG. 3 depicts an example computer system. A computer system includes a processor unit 301 (possibly including multiple processors, multiple cores, multiple nodes, and/or implementing multi-threading, etc.). The computer system includes memory 307A-307F. The memory 307A-307F may be system memory (e.g., one or more of cache, SRAM, DRAM, RDRAM, EDO RAM, DDR RAM, EEPROM, etc.) or any one or more of the above already described possible realizations of machine-readable media. The computer system also includes a bus 303 (e.g., PCI, ISA, PCI-Express, HyperTransport, InfiniBand, NuBus, etc.), a network interface 305 (e.g., an ATM interface, an Ethernet interface, a Frame Relay interface, SONET interface, etc.), and a storage device(s) 309A-309D (e.g., optical storage, magnetic storage, etc.). The system memory 307A-307F embodies a software tool that merges an object file into an already existing binary file. Functionality for a such a software tool may be partially (or entirely) implemented in hardware and/or on the processing unit 301. For example, the functionality may be implemented with an application specific integrated circuit, in a unit in the processing unit 301, in unit on a peripheral device or card, etc. Realizations may include fewer or additional components not illustrated in FIG. 3 (e.g., video cards, audio cards, additional network interfaces, peripheral devices, etc.). The processor unit 301, the storage device(s) 309A-309D, and the network interface 305 are coupled to the bus 303. The memory 307A-307F is either coupled directly or indirectly to the bus 703.

Other Embodiments

While the invention(s) is (are) described with reference to various implementations and exploitations, it will be understood that these embodiments are illustrative and that the scope of the invention(s) is not limited to them. In general, techniques for deriving uncoverage information for code described herein may be implemented with facilities consistent with any hardware system or hardware systems hereafter defined. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
examining control flow information for a binary file and an object file;
intelligently inserting code, on a processor, from the object file into the binary file, prior to run-time and in accordance with the examining, to extend or modify functionality of the binary file with functionality implemented of the code; and
updating a symbol table of the binary file, on the processor, to represent the incorporated code from the object file.

2. The method of claim 1 further comprising:
updating the binary file symbol table to include a new symbol for the code and a symbol definition for the code.

3. The method of claim 1 wherein the code is inserted either at the end of the binary file or within the binary file.

4. The method of claim 1 further comprising:
updating an entry in the binary file symbol table to represent the code from the object file, wherein the entry previously represented a code unit of the binary file being replaced with the object file code.

5. The method of claim 4, wherein the inserting comprises one of overwriting the replaced code unit, marking the replaced code unit to be ignored, and removing the replaced code unit.

6. The method of claim 1 further comprising:
modifying a reference, in the code from the object file, to an external definition for an externally defined symbol in the code to refer to an already existing entry for the externally defined symbol in a linking table of the binary file.

7. The method of claim 1 further comprising:
modifying the code to open a path and to dynamically locate an external definition for an externally defined symbol in the opened path, the code including a reference to the externally defined symbol.

8. The method of claim 1 further comprising:
marking an externally defined symbol in the code for runtime relocation.

9. The method of claim 1 further comprising:
analyzing the binary file and building the control flow information with the analysis of the binary file.

10. The method of claim 1, wherein the updating comprises at least one of adding a symbol from the object file symbol table to the binary file symbol table and re-defining a symbol in the binary file symbol table in accordance with the object file symbol table.

11. The method of claim 10, wherein the re-defining comprises:
updating the binary file symbol table to indicate both an old definition already in the binary file symbol table and a new definition added from the object file symbol table for the re-defined symbol;
modifying references in the binary file to reference the new definition.

12. The method of claim 11 further comprising restoring references to the re-defined symbol to refer back to the old definition.

13. The method of claim 1, wherein the set of symbols represents at least one of variables, data structures, functions, and data types.

14. The method of claim 1, wherein the intelligently inserting code utilizes information from a control flow analysis of the binary file.

15. A computer program product encoded in one or more non-transitory machine-readable media, the computer program product comprising:
a first sequence of instructions executable to modify a binary file, prior to run-time, to include a symbol definition for a symbol from a symbol table of an object file, the symbol corresponding to a code unit of the object file;
a second sequence of instructions executable to modify the binary file, prior to run-time by:
examining control flow information for the binary file and the object file; and
intelligently inserting the code unit from the object file into the binary file in accordance with the examined control flow information.

16. The computer program product of claim 15, wherein the first sequence of instructions are executable to,
search a symbol table of the binary file for the symbol,
add an entry to the symbol table of the binary file for the symbol if the symbol is not found in the symbol table, and
overwrite an existing definition in the binary file symbol table with the symbol definition from the object file if the symbol is found in the binary file symbol table.

17. The computer program product of claim 16 further comprising:
a third sequence of instructions executable to,
request indication of whether to preserve the existing definition for the symbol in the binary file symbol table as inactive, and
add the symbol definition from the object file to the binary file symbol table and modify the binary file to refer to the added symbol definition; and
a fourth sequence of instructions executable to restore the preserved inactive symbol definition.

18. The computer program product of claim 15, wherein the second sequence of instructions are executable to modify references to the symbol to refer to location of the code unit in the binary file.

19. The computer program product of claim 15 further comprising the second sequence of instructions being executable to modify the binary file to open a path for an externally defined symbol referenced in the code unit and to dynamically locate a corresponding object file in the opened path that defines the externally defined symbol.

* * * * *